(12) United States Patent
Casino

(10) Patent No.: US 6,847,887 B1
(45) Date of Patent: Jan. 25, 2005

(54) METHOD AND SYSTEM FOR OBTAINING ROAD GRADE DATA

(75) Inventor: Roy Casino, Mundelein, IL (US)

(73) Assignee: Navteq North America, LLC, Chicago, IL (US)

( * ) Notice: Subject to any disclaimer, the term of this patent is extended or adjusted under 35 U.S.C. 154(b) by 0 days.

(21) Appl. No.: 10/379,279

(22) Filed: Mar. 4, 2003

(51) Int. Cl.[7] .............................................. G06F 17/00
(52) U.S. Cl. ..................... 701/208; 701/94; 701/213; 340/995.18; 340/995.24
(58) Field of Search .......................... 701/94, 200, 208, 701/211, 213; 340/995.1, 995.18, 995.24

(56) References Cited

U.S. PATENT DOCUMENTS

| | | | | |
|---|---|---|---|---|
| 3,752,251 | A | * | 8/1973 | Gaeke .......................... 180/104 |
| 5,132,906 | A | * | 7/1992 | Sol et al. ....................... 701/80 |
| 5,158,060 | A | * | 10/1992 | Hara ............................ 123/494 |
| 5,659,680 | A | * | 8/1997 | Cunningham et al. ......... 714/25 |
| 5,703,776 | A | * | 12/1997 | Soung .......................... 701/65 |
| 5,832,400 | A | * | 11/1998 | Takahashi et al. ............. 701/53 |
| 6,042,505 | A | * | 3/2000 | Bellinger ..................... 477/111 |
| 6,047,234 | A | * | 4/2000 | Cherveny et al. ........... 701/200 |
| 6,199,001 | B1 | * | 3/2001 | Ohta et al. .................... 701/51 |
| 6,278,928 | B1 | * | 8/2001 | Aruga et al. .................. 701/65 |
| 6,295,492 | B1 | * | 9/2001 | Lang et al. .................... 701/33 |
| 6,392,535 | B1 | * | 5/2002 | Matsuno et al. ............ 340/441 |
| 6,484,086 | B2 | | 11/2002 | Jeon ............................. 701/93 |
| 6,510,374 | B1 | * | 1/2003 | Saotome et al. .............. 701/80 |
| 6,529,827 | B1 | * | 3/2003 | Beason et al. ............. 701/213 |
| 2003/0033071 | A1 | * | 2/2003 | Kawasaki ..................... 701/80 |

OTHER PUBLICATIONS

Bae, Hong S.; Ryu, Jihan; Gerdes, J. Christian, "Road Grade and Vehicle Parameter Estimation for Longitudinal Control Using GPS", *2001 IEEE Intelligent Transportation Systems Conference Proceedings*–Oakland (CA). Aug. 25–29, 1991, pp. 168–173.

* cited by examiner

*Primary Examiner*—Michael J. Zanelli
*Assistant Examiner*—Eric M. Gibson
(74) *Attorney, Agent, or Firm*—Jon D. Shutter; Frank J. Kozak; Lawrence M. Kaplan

(57) ABSTRACT

A method for collecting data for a geographic database is disclosed. Engine load value and position data are collected using a vehicle traveling in a geographic region. A location of a road grade change point is identified corresponding to a change in the engine load value data. The geographic database is updated to indicate the road grade.

20 Claims, 7 Drawing Sheets

METHOD AND SYSTEM FOR OBTAINING ROAD GRADE DATA

BACKGROUND OF THE INVENTION

The present invention relates to collecting geographic data for a geographic database and more particularly, the present invention relates to a method and system for collecting road grade data for a geographic database using engine load.

Geographic databases have various uses. Geographic databases are used in in-vehicle navigation systems, personal computers, networked computing environments, and various other kinds of platforms, as well as on the Internet. Geographic databases are used with various kinds of applications to provide various navigation-related and map-related functions including map display, route calculation, route guidance, truck fleet deployment, traffic control, traffic monitoring, electronic yellow pages, roadside assistance, emergency services, and so on.

In order to provide these kinds of functions, a geographic database includes data that represent geographic features in a region. The geographic features that are represented in a geographic database may include roads, intersections, and so on. A geographic database includes information about the represented geographic features, such as the geographic coordinates of roads in a geographic region, speed limits along the road segments, locations of stop lights, turn restrictions at intersections of roads, address ranges, street names, and so on.

Collecting information for a geographic database is a significant task. Not only is the initial collection of data a significant undertaking, but a geographic database needs to be updated on a regular basis. For example, new streets are constructed, street names change, traffic signals are installed, and turn restrictions are added to existing roads. Also, new levels of detail may be added about geographic features that are already represented in an existing geographic database. For example, an existing geographic database for roads may be enhanced with information about lane widths, shoulder sizes, traffic signs, lane barriers, address ranges, sidewalks, bicycles paths, etc. Thus, there exists a need to continue to collect information for a geographic database.

One type of information that is useful to include in a geographic database is road grade information. One way of measuring road grade is with a vehicle having a mechanical road grade sensor traveling the road. Briefly, the mechanical road grade sensor has a weighted mechanical arm that gravity positions perpendicular to the horizontal plane of a vehicle when the vehicle travels on a flat road segment. When the vehicle travels on an inclined or declined road segment, gravity will position the mechanical arm at an angle to the horizontal plane of the vehicle. U.S. Pat. No. 3,752,251 illustrates an example of a mechanical road grade sensor. One shortcoming of the mechanical road grade sensors is that they may provide inaccurate road grade measurements when traveling over bumps or a rough road.

Another way of measuring road grade is with a vehicle having an altimeter, aneroid barometer or similar devices. The aneroid barometer is calibrated to show changes in atmospheric pressure in terms of linear elevation. As the vehicle travels up an incline, the aneroid barometer records the elevation at various points. The road grade may readily be determined using the elevations between the points. One shortcoming with the aneroid barometer is that it may provide inaccurate readings due to weather, wind and speed of the vehicle. Additionally, such devices are relatively expensive. Furthermore, road grade may be derived with altitude at points along the road determined using surveying equipment. However, surveying equipment may require that the equipment be mounted in a stationary position and therefore is not useable in a moving vehicle.

Accordingly, it would be beneficial to collect road grade information more inexpensively, efficiently and accurately.

SUMMARY OF THE INVENTION

To address these and other objectives, the present invention comprises a method and system for obtaining road grade data for a geographic database. Engine load value and position data are collected using a vehicle traveling in a geographic region. A location of a road grade change point is identified corresponding to a change in the engine load value data. The geographic database is updated to indicate the road grade.

DETAILED DESCRIPTION OF THE PRESENTLY PREFERRED EMBODIMENTS

I. Geographic Database

Figure 1:
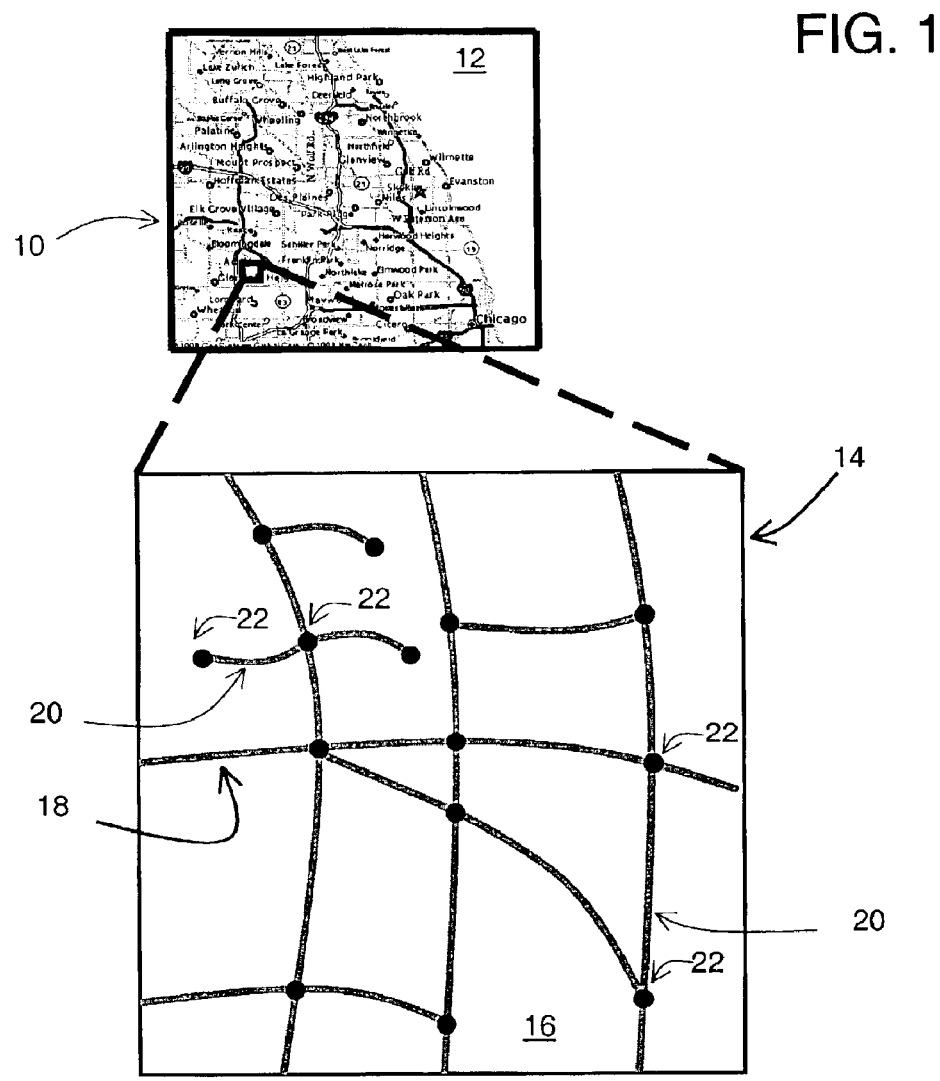
FIG. 1 shows a map of a geographic region.

FIG. 1 shows a map 10 of a geographic region 12. The geographic region 12 may correspond to a metropolitan or rural area, a state, a country, or combinations thereof, or any other area of comparable size. Located in the geographic region 12 are physical geographic features, such as roads, points of interest (including businesses, municipal facilities, etc.), lakes, rivers, railroads, municipalities, etc.

FIG. 1 also includes an enlarged map 14 of a portion 16 of the geographic region 12. The enlarged map 14 illustrates part of the road network 18 in the geographic region 12. The road network 18 includes, among other things, roads and intersections located in the geographic region 12. As shown in the portion 16, each road in the geographic region 12 is composed of one or more road segments 20. A road segment 20 represents a portion of the road. Each road segment 20 is shown to have associated with it two nodes 22; one node represents the point at one end of the road segment and the other node represents the point at the other end of the mad segment. The node at either end of a road segment may correspond to a location at which the road meets another road, i.e., an intersection, or where the road dead-ends.

Figure 2:
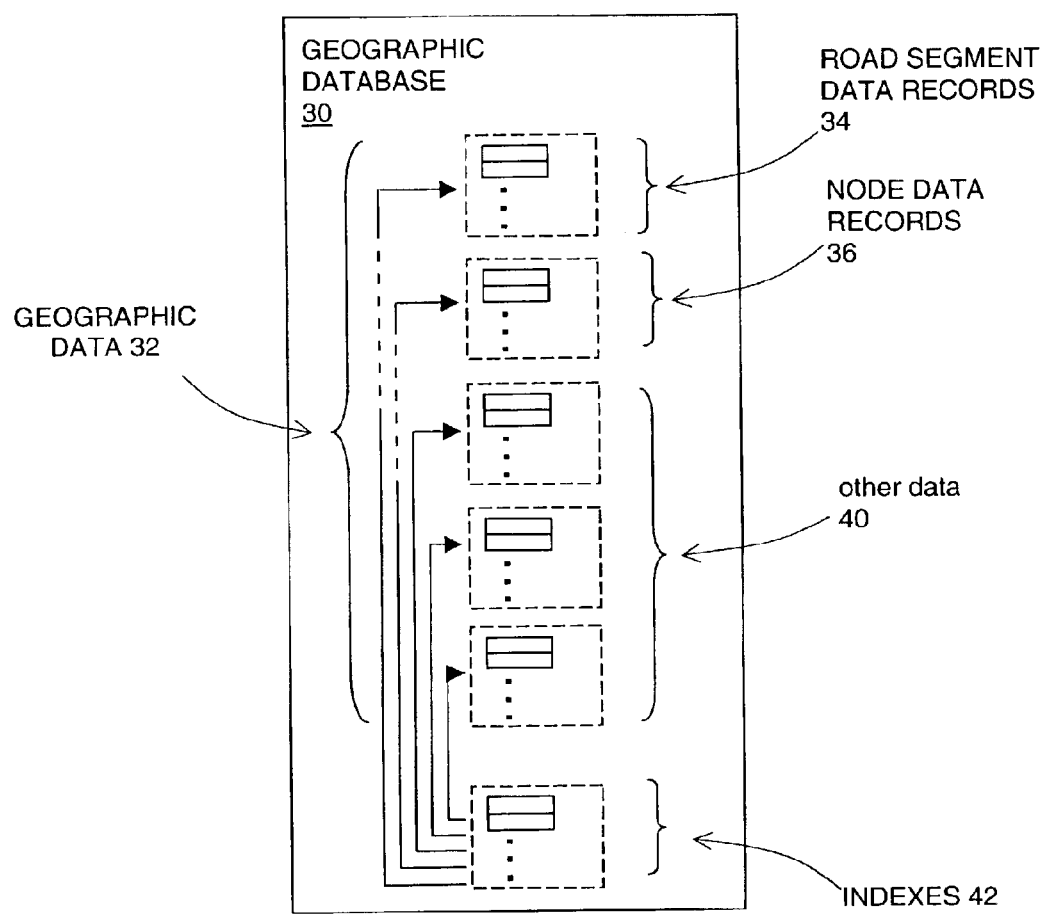
FIG. 2 is a block diagram of a geographic database that represents the geographic region of FIG. 1.

Referring to FIG. 2, a geographic database 30 contains data 32 that represents some of the physical geographic features in the geographic region (12 in FIG. 1). The data 32 contained in the geographic database 30 includes data that represent the road network 18. In the embodiment of FIG. 2, the geographic database 30 that represents the geographic region 12 contains at least one database record 34 (also referred to as "entity" or "entry") for each road segment 20 in the geographic region 12 in FIG. 1. The geographic database 30 that represents the geographic region 12 also includes a database record 36 (or "entity" or "entry") for each node 22 in the geographic region 12. (The terms "nodes" and "segments" represent only one terminology for describing these physical geographic features and other terminology for describing these features is intended to be encompassed within the scope of these concepts.)

The geographic database 30 may also include other kinds of data 40. The other kinds of data 40 may represent other kinds of geographic features or anything else. The other kinds of data may include point of interest data. For example, the point of interest data may include point of interest records comprising a type (e.g., the type of point of interest, such as restaurant, hotel, city hall, police station, historical marker, ATM, golf course, etc.), location of the point of interest, a phone number, hours of operation, etc. The geographic database 30 also includes indexes 42. The indexes 42 may include various types of indexes that relate the different types of data to each other or that relate to other aspects of the data contained in the geographic database 30.

Figure 3:
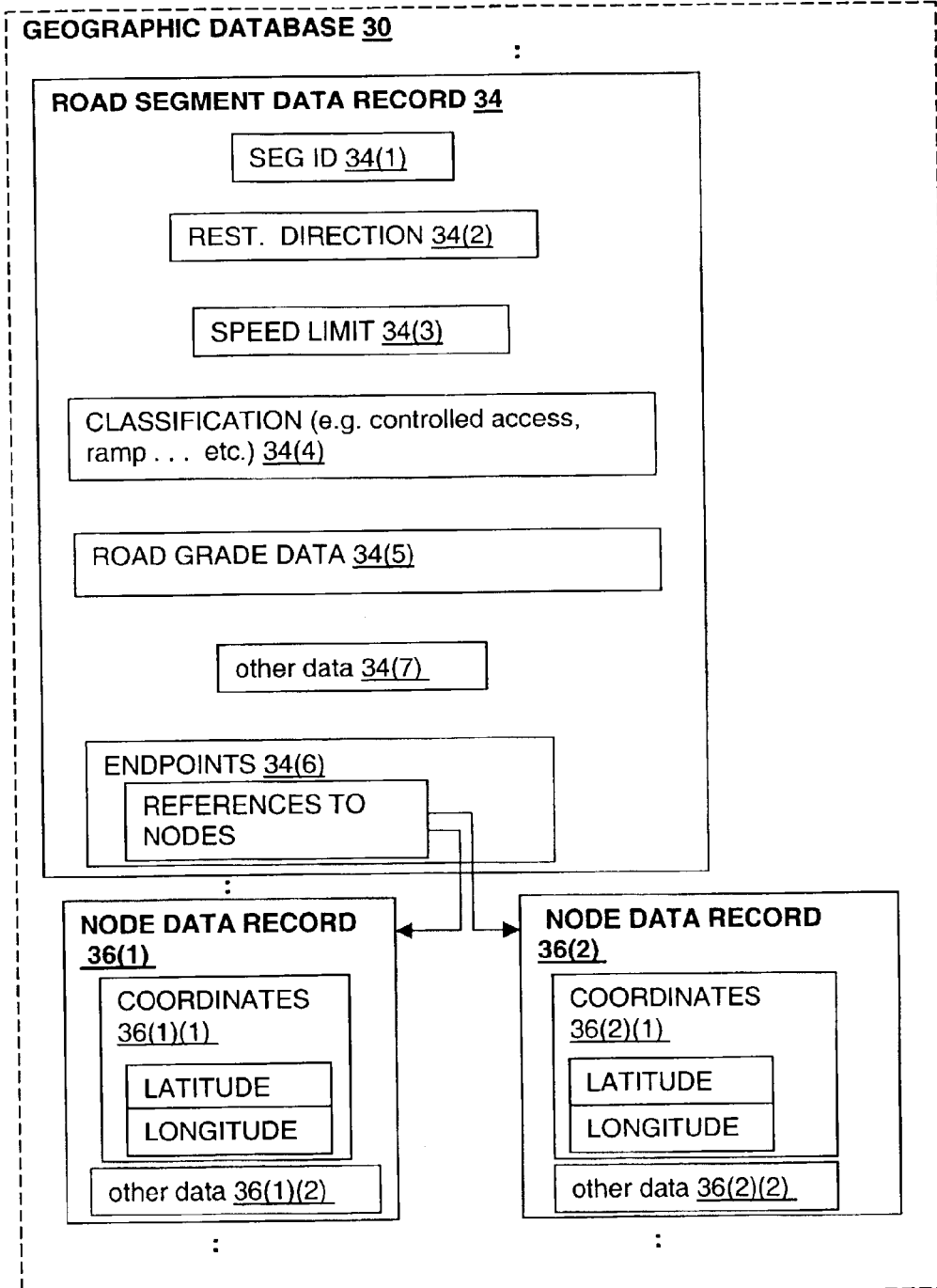
FIG. 3 is a block diagram showing a road segment data record contained in the geographic database of FIG. 2.

FIG. 3 shows some of the components of a road segment data record 34 contained in the geographic database 30. The road segment record 34 includes a segment ID 34(1) by which the data record can be identified in the geographic database 30. Each road segment data record 34 has associated with it information (such as "attributes", "fields", etc.) that describes features of the represented road segment. The road segment data record 34 may include data 34(2) that indicate the restrictions, if any, on the direction of vehicular travel permitted on the represented road segment. The road segment data record 34 includes data 34(3) that indicate a speed limit or speed category (i.e., the maximum permitted vehicular speed of travel) on the represented road segment. The road segment data record 34 may also include data 34(4) indicating whether the represented road segment is part of a controlled access road (such as an expressway), a ramp to a controlled access road, a bridge, a tunnel, a toll road, a ferry, and so on.

The road segment record 34 may also include road grade data 34(5) that indicate the grade of the road segment. In one embodiment, the road grade data 34(5) includes road grade change points and a corresponding percentage of grade change. The location of the road grade change point is represented as a position along the road segment, such as thirty feet from the end or node of the road segment. For example, the road segment may have an initial road grade associated with its beginning node. The road grade change point indicates the position on the road segment wherein the road grade or slope changes, and percentage of grade change indicates a percentage increase or decrease of the grade or slope. Each road segment may have several grade change points depending on the geometry of the road segment. In another embodiment, the road grade data 34(5) includes the road grade change points and an actual road grade value for the portion of the road segment after the road grade change point until the next road grade change point or end node. In a further embodiment, the road grade data 34(5) includes elevation data at the road grade change points and nodes.

The road segment data record 34 also includes data 34(6) providing the geographic coordinates (e.g., the latitude and longitude) of the endpoints of the represented road segment. In one embodiment, the data 34(6) are references to the node data records 36 that represent the nodes corresponding to the endpoints of the represented road segment. The road segment data record 34 may also include or be associated with other data 34(7) that refer to various other attributes of the represented road segment. The various attributes associated with a road segment may be included in a single road segment record, or may be included in more than one type of record which are cross-referenced to each other. For example, the road segment data record 34 may include data identifying what turn restrictions exist at each of the nodes which correspond to intersections at the ends of the road portion represented by the road segment, the name or names by which the represented road segment is known, the street address ranges along the represented road segment, and so on.

Each of the node data records 36 may have associated information (such as "attributes", "fields", etc.) that allows identification of the road segment(s) that connect to it and/or its geographic position (e.g., its latitude and longitude coordinates). For the embodiment shown in FIG. 3, the node data records 36(1) and 36(2) include the latitude and longitude coordinates 36(1)(1) and 36(2)(1) for their node. The node data records 36(1) and 36(2) also include other data 36(1)(2) and 36(2)(2) for their node.

The data records 34 in the geographic database 30 that represent roads may not necessarily include all the same types of data attributes. One reason for this is that roads do not all have the same properties. For example, some roads have a highway designation (e.g., "Wisconsin State Highway 120") whereas other roads do not. Another reason why data records in the geographic database 30 that represent roads may not have the same data attributes is that some of the properties of a road may not have been collected or confirmed. Collecting data about roads for a geographic database may involve multiple steps. For example, road geometry data may be obtained using aerial photographs and then, physically driving along the roads and recording the road grade obtain road grade data. Additionally, the road grade data may be collected using the data collection system as described below In one embodiment, road grade data are obtained for all the roads represented in the geographic database. In another embodiment, road grade data are included for only some of the roads represented in the geographic database. According to this latter embodiment, some of the roads are represented by data records that do not include road grade data.

II. System For Obtaining Road Grade Data

A. Data Collection System

Figure 4:
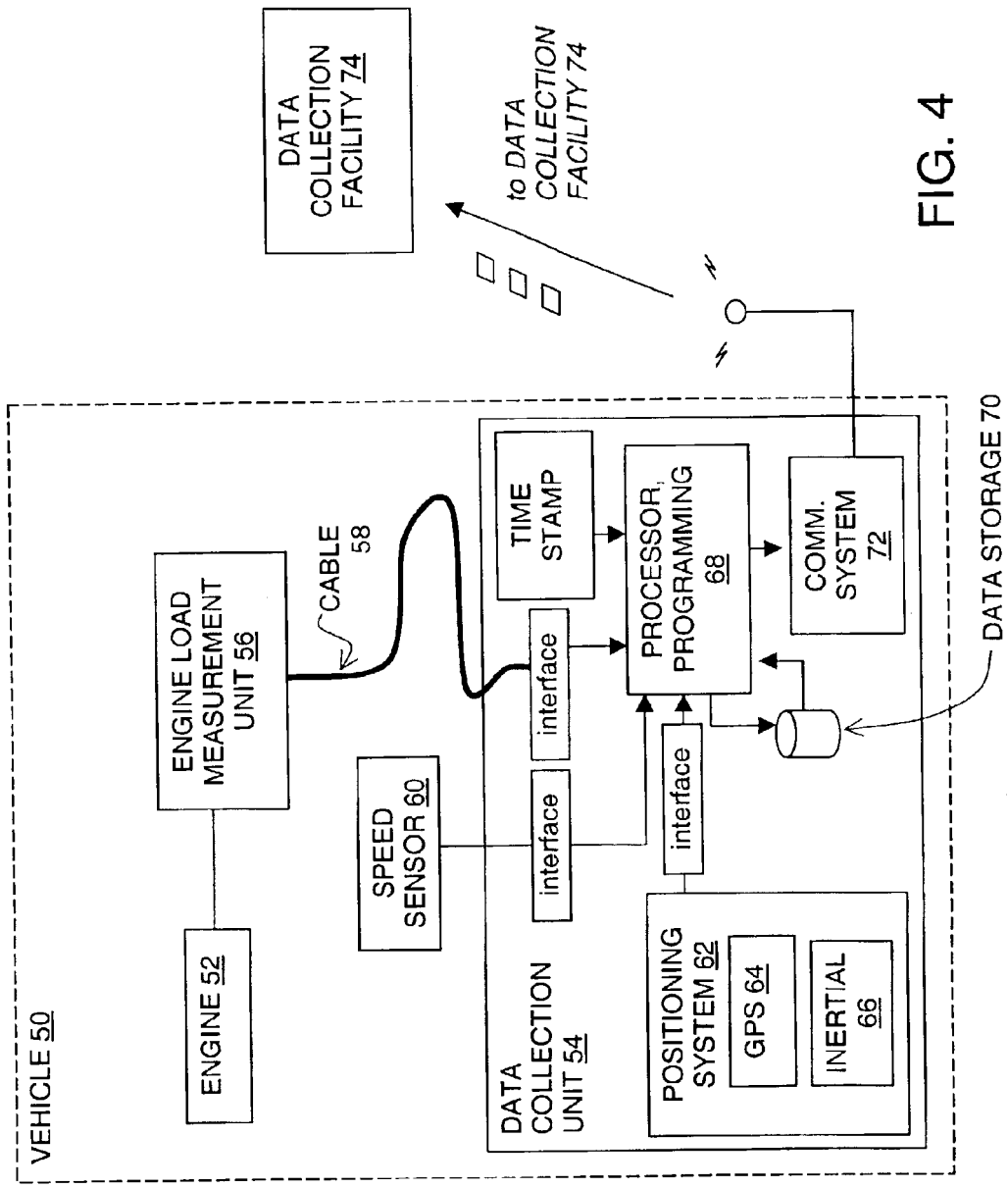
FIG. 4 is a block diagram illustrating a first embodiment in which a vehicle is equipped for data collection.

FIG. 4 shows a vehicle 50 equipped with an engine 52 and a data collection unit 54. The vehicle 50 may be a data collection vehicle operated by a geographic database developer. The data collection vehicle is operated specifically for data collection purposes. The geographic database developer determines the routes traveled by the vehicle in order to collect specific data. Alternatively, the vehicle 50 is operated as a probe vehicle. A probe vehicle is a vehicle that collects road-related data while it is being used for purposes unrelated to the collection of road-related data. For example, a probe vehicle is operated for ordinary, everyday purposes, such as commuting, leisure or business. A member of the public may operate the probe vehicle, or alternatively, a commercial enterprise or government entity may operate the probe vehicle. While the probe vehicle is being used for a purpose unrelated to the collection of road-related data, the data collection unit 54 in the vehicle 50 operates to collect road-related data.

Referring to FIG. 4, the vehicle 50 includes an engine load measurement unit 56 that provides a measurement of engine load. Engine load is basically a measurement of how hard the engine 52 is working. Most vehicles built within approximately the last fifteen years have mechanisms that provide engine-load information to an electronic control unit (ECU) associated with the engine 52. The ECU calculates an engine load value using information from an engine load sensor. The ECU uses the engine load value to control engine related functions such as spark timing and fuel release. One sensor used to measure engine load is a mass airflow sensor that measures the actual weight (mass) in grams of the air per second that is being used by the engine. Other engine load sensors include a manifold absolute pressure sensor, a volume airflow sensor and a throttle position sensor and any other engine load sensors. One example of a calculation for engine load is the product of the current airflow and atmospheric pressure at sea level divided by the product of the peak airflow at sea level and current barometric pressure. This calculation provides an engine load value as a percentage of maximum engine load. Any other suitable calculation for engine load may also be used. Alternatively, a parameter may be measured that relates to engine load.

The engine load measurement unit 56 shown in FIG. 4 generically represents mechanisms present in the vehicle 50 for measuring the engine load value, such as the ECU and associated sensors or any devices that measure engine load. Alternatively, the engine load measurement unit 56 may independently calculate the engine load value. Moreover, the engine load measurement unit 56 may simply obtain the engine load value from devices associated with the engine, such as the ECU. Further, the engine load measurement unit 56 may obtain the engine load measurement directly from a OBD-II port. One method for obtaining engine information from the OBD-II port is described in U.S. patent application Ser. No. 10/253,573, entitled "USING THE OBD-II PORT TO INSTALL A NAVIGATION SYSTEM OR DATA COLLECTION SYSTEM IN A VEHICLE," the entire disclosure of which is incorporated by reference herein.

The data collection unit 54 is connected to the engine load measurement unit 56 via a cable 58 or other suitable means. (Although not shown in FIG. 4, the data collection unit 54 may include other connections to the vehicle. For example, the data collection unit 54 may receive power from the vehicle battery via a power cable.) The data collection unit 54 is also connected to a speed sensor 60. The speed sensor 60 provides speed data indicating the current speed of the vehicle 50. The speed sensor 60 is any device or sensor that provides speed data, such as an odometer and a speed pulse sensor.

The data collection unit 54 is a combination of hardware and software components. The data collection unit 54 includes a positioning system 62. The positioning system 62 includes a GPS 64. The positioning system 62 may also include inertial sensors 66. The positioning system 62 enables the position (e.g., latitude, longitude, and optionally altitude) of the data collection unit 54 (and thus the vehicle 50 in which it is located) to be determined.

The data collection unit 54 also includes the necessary hardware and software (processor and programming 68) to receive data from the positioning system 62, the engine load measurement unit 56, and the speed sensor 60. The data collection unit 54 includes the appropriate interfaces to allow the processor and programming 68 to receive data from the positioning system 62, the engine load measurement unit 56 and the speed sensor 60. The processor and programming 68 in the data collection unit 54 are suitable for selecting the engine load value from the engine load measurement unit 56 at appropriate time periods, such as every second. Additionally, the processor and programming 68 select the data from the positioning system 62 at corresponding times. Furthermore, the processor and programming 68 select data from the speed sensor 60 at corresponding times. The processor and programming 68 relate the data received from the positioning system 62, the engine load measurement unit 56 and the speed sensor 60 to each other. Furthermore, the processor and programming 68 may associate the data received from the positioning system 62, the engine load measurement unit 56 and the speed sensor 60 with a time stamp or any other information.

The data collection unit 54 includes a data storage device 70. The processor and programming 68 in the data collection unit 54 provide for storing some or all the data from the positioning system 62, the engine load measurement unit 56 and the speed sensor 60 on the data storage device 70. The data storage device 70 is a non-volatile data storage unit, such as a hard drive or a memory card.

In one embodiment, the data collection unit 54 may receive data from a vehicle navigation system or may be part of the navigation system. There are various kinds of navigation systems installed in vehicles. Some navigation systems use vehicle data in connection with providing certain navigation-related functions. As an example, some vehicle navigation systems use the vehicle speed or wheel speed in conjunction with other devices, such as an accelerometer or GPS, to help determine the position of the vehicle. The data collection unit 54 may receive position and speed data from the navigation system. Alternatively, the navigation system may perform the functions of the data collection unit 54 and may include an additional processor and programming to collect the engine load data.

The data collection unit 54 includes a communications system 72. The communications system 72 provides for sending some or all the data from the positioning system 62, the engine load measurement unit 56 and the speed sensor 60 to a remotely located data collection facility 74. In the embodiment of FIG. 4, the communications system 72 provides for wireless transmission of the data from the data collection unit 54 to the remotely located data collection facility 74. In the embodiment of FIG. 4, the data sent from the data collection unit 54 are stored temporarily on the data storage device 70 before being transmitted to the data collection facility 74. Various processes may be performed on the data before they are sent to the remotely located data collection facility 74. For example, the data may be compressed, filtered, normalized, etc. These processes may be performed to reduce the amount of data that need to be sent from the data collection unit 54 to the data collection facility 74.

In one alternative, the data collected by the data collection unit 54 are sent every several seconds or minutes to the data collection facility 74 after being temporarily stored on the data storage device 70 in the data collection unit 54.

In another alternative embodiment, the data collected by the data collection unit 54 are sent directly to the data collection facility 74 without being temporarily stored on a data storage device in the data collection unit 54.

In another alternative embodiment, the data collected by the data collection unit 54 are stored in the vehicle for a relatively long period of time, e.g., several days or weeks. The data are then sent to the data collection facility 74. The data may be sent wirelessly via a communications system or alternatively, the data may be sent by other means. For example, the data may be transmitted over land-based telephone lines or the Internet. In another embodiment, the data storage medium upon which the data are stored is physically sent to the data collection facility 74 (e.g., by mail). At the data collection facility 74, further processing of the data takes place.

B. Data Collection Facility

Figure 5:
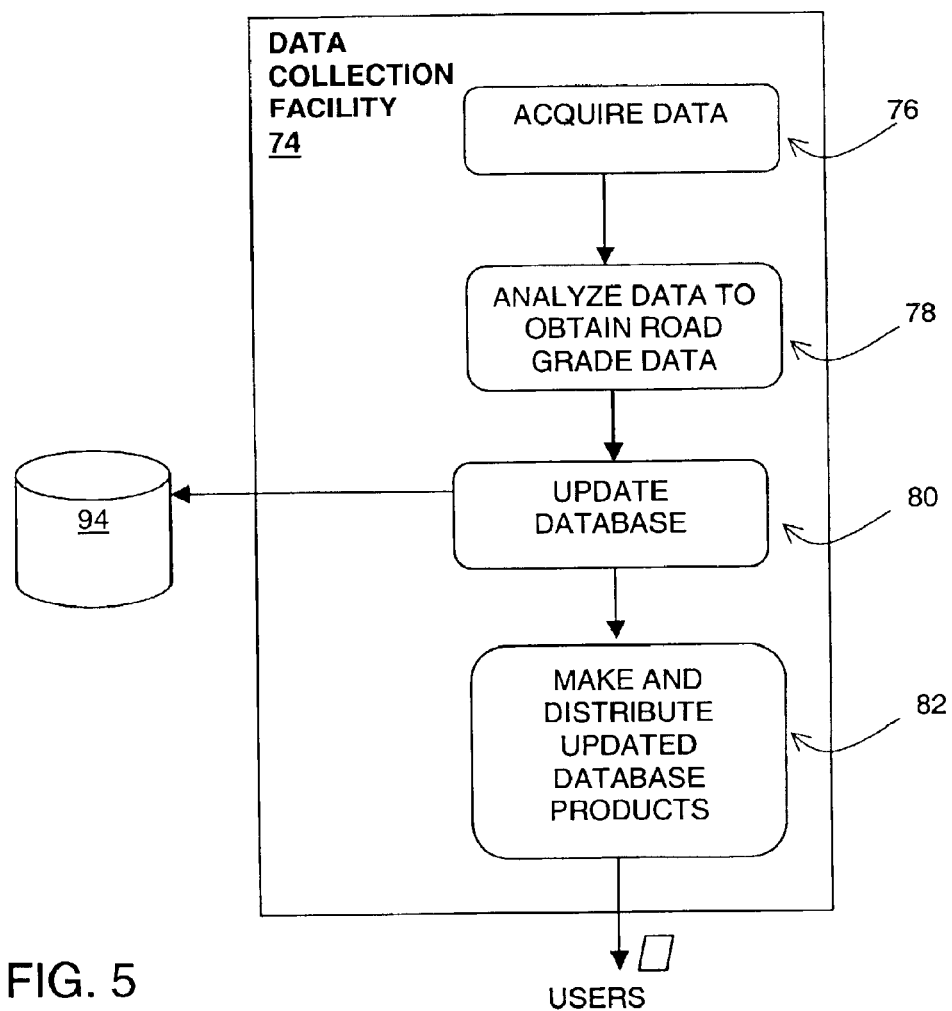
FIG. 5 is a flow chart of the operations of a data collection facility.

According to one embodiment, the data collection facility 74 obtains road grade information and updates the geographic database following the steps shown in FIG. 5. The data collection facility 74 receives the data from the vehicle 50 at step 76. The data collection facility 74 obtains the data from the data collection vehicle that is operated by the geographic database developer. Alternatively, the data collection facility 74 may obtain the data from numerous probe vehicles. The data collection facility 74 may obtain the data from the vehicle(s) 50 by wireless data transmission or by other means (e.g., sending a diskette or via modem).

The data collection facility 74 processes the data received from the vehicle(s) 50 to obtain road grade data at step 78. In one embodiment, the data collection facility 74 processes the engine load and position data from the vehicle(s) 50 to identify road grade change points along the road traveled by the vehicle(s) 50. In another embodiment, the data collection facility 74 processes the engine load and position data from the vehicle(s) 50 to infer the road grade or slope of portions of the road traveled by the vehicle(s) 50.

Briefly, the data collection facility 74 analyzes the engine load data that measures how hard the engine 52 is working. The engine 52 works harder to travel up hill than it docs on a level road segment. Additionally, the engine 52 works less to coast down hill than it does on a level road segment. By analyzing the engine load data as the vehicle travels along, the data collection facility 74 identifies the road grade change points, direction of road grade and/or actual road grade values on the roads traveled by the vehicle(s).

Figure 6:
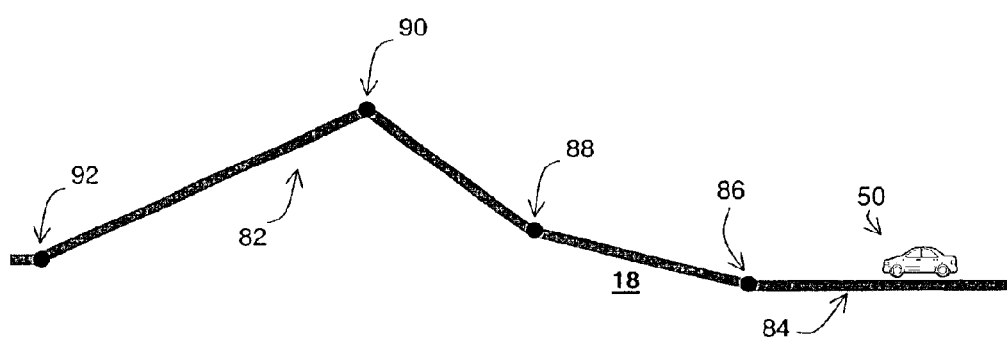
FIG. 6 shows a portion of a road network.

FIG. 6 illustrates a portion of the road network 18 including a hill 82 with varying slope and a flat portion 84 in the geographic region 12. The data collection facility 74 analyzes the engine load data and position data to identify the road grade change points and direction of the road grade. FIG. 6 provides examples of the analysis for identifying the road grade change points. On the flat portion 84 of the road segment, the vehicle 50 travels on a level surface of the road network 18. The engine 52 of the vehicle 50 on the level portion 84 revs at a certain number of revolutions per minute that mechanically corresponds to a speed because of a mechanical connection of a given gear. For a certain speed, the engine 52 operates at a baseline engine load value on the flat portion 84 of the road. When the vehicle 50 travels past a position 86, the vehicle 50 travels up an incline. To maintain the same speed and revolutions per minute in the same gear on the inclined portion as on the flat portion 84, the engine 52 works harder and produces a higher engine load value than the baseline engine load value. The approximate position of the engine load changing from the baseline engine load value to the higher engine load value is a road grade change point corresponding with position 86. Additionally, the higher engine load value than the baseline engine load value indicates a positive road grade or inclines after position 86.

The analysis also processes the position data to identify the road segment and location on the road segment corresponding to the road grade change point. Because the engine load change may typically lag the physical road grade change, the location of the road grade change point may be located a short distance before the position of the engine load change. The distance corresponding to the lag of the engine load change from the physical road grade change may be determined as a predetermined lag amount by direct observation, calculation or estimation. The location of the road grade change point may then be readily determined as a position on the road segment the predetermined lag amount prior to the position of the engine load change.

When the vehicle 50 travels past a position 88, the vehicle 50 travels up a steeper incline. To maintain the same speed and revolutions per minute in the same gear on the steeper inclined portion as on the prior incline portion, the engine 52 works harder and produces a higher engine load value than the prior engine load value. The approximate position of the engine load changing to the higher engine load value is a road grade change point corresponding with position 88. Additionally, the higher engine load value indicates a positive road grade or inclines after position 88.

When the vehicle 50 travels past a position 90, the vehicle 50 travels down a decline. To maintain the same speed and revolutions per minute in the same gear on the decline portion as on the prior incline portion, the engine 52 works less and produces a lower engine load value than the prior engine load value. The approximate position of the engine load changing to the lower engine load value is a road grade change point corresponding with position 90. Additionally, the lower engine load value, less than the baseline engine load value, indicates a negative road grade or decline after position 90.

When the vehicle 50 travels past a position 92, the vehicle 50 is traveling on a level portion of the road. To maintain the same speed and revolutions per minute in the same gear on the level portion as on the prior decline portion, the engine 52 works harder that produces a higher engine load value than the prior engine load value. Because the road portion after position 92 is level, the engine load value is approximately equal to the baseline engine load value. The approximate position of the engine load changing to the higher engine load value (or baseline engine load value) is a road grade change point corresponding with position 92. Additionally, the higher engine load value approximately equal to the baseline engine load value indicates a level road grade after position 92.

When the data collection facility 74 processes the engine load and position data to identify the road grade data, the data collection facility also considers the associated speed data. Changing vehicle speed affects the engine load value. For example, the engine load value increases with speed increases, and the engine load value decreases with speed reductions. In one embodiment, the data collection facility 74 filters the data received from the vehicle(s) 50 to identify data associated with vehicle speed changes. The data collection facility 74 may also filter the data according to other filtering criteria to insure that the changes in engine load values are likely due to road grade changes. Additionally, the filtering criteria may be selected to determine the road grade data in a particular portion of the geographic region. The data collection facility 74 analyzes the engine load and position data meeting the filtering criteria and discards the data not meeting the filtering criteria. In another embodiment, rather than the data collection facility 74 filtering the data, the data collection unit 104 may filter the data according to the filtering criteria prior to sending the data to the data collection facility 74.

When the data collection facility 74 processes the engine load and position data to identify the road grade data, the data collection facility may also consider other associated factors, such as wind and atmospheric pressure that may affect the measured engine load value. These factors may be taken into account by analyzing the data collected from a number of different vehicles over time.

In addition to identifying the locations of road grade change points and the direction of road slope, the data collection facility 74 also processes the data to identify actual road grade values for the roads traveled by the vehicle(s). In one embodiment, the analysis determines a percentage increase or decrease in road grade that corresponds with the measured increase or decrease of engine load values at the road grade change point. The change in road grade value corresponding to the change in engine load value may be determined with field tests and mathematical modeling. The mathematical model and/or the modeled road grade value changes with corresponding engine load changes may be stored in a look-up table in a storage device associated with the data collection facility 74. The data collection facility 74 processes the data using the mathematical model and/or look-up table to determine the change in road grade value corresponding with the measured change in engine load value at the road grade change point.

Additionally, the analysis performed by the data collection facility 74 may determine the actual road grade value that corresponds with the measured engine load values. The actual road grade value corresponding to the engine load value may be determined with field tests and mathematical modeling. The mathematical model and/or modeled road grade values with corresponding engine load values may be stored in a look-up table in a storage device associated with the data collection facility 74. The data collection facility 74 processes the data using the mathematical model and/or look-up table to determine the road grade value corresponding with the measured engine load value at various locations.

Referring to FIG. 5, after the analysis of step 78, the road grade data are stored in a master copy 94 of the geographic database at step 80. The road grade data may be stored as an attribute to the road segment data record 34. The road grade data that are stored in the master copy 94 of the geographic database may be used to update existing data or to add new data. For example, the master copy 94 of the database may already include road grade data for a particular represented road segment. The new road grade data obtained by using the process described in FIG. 5 can be used to update the existing data, e.g., confirm the existing data or make the existing data more accurate. Alternatively, the master copy 94 of the geographic database may not include road grade data for a particular road segment. If new road grade data are obtained for a road segment that is represented by a data record that does not already include a road grade data attribute, the new road grade data can be added as a new attribute of the data record.

In one embodiment, prior to updating existing data or adding new data to the master copy of the geographic database with the road grade data, the existence and position of some the identified road grade information may be confirmed by direct observation of field personnel.

The geographic database with new or improved road grade data and other data can be used to make derived database products at step 82. The derived database products may include only portions of all the data in the master version 94 of the database. For example, the derived database products may include data that relate to only one or more specific regions. The derived database products may be used on various kinds of computing platforms. For example, the derived database products may be used in navigation systems (such as in-vehicle navigation systems and hand-held portable navigation systems), personal computers (including desktop and notebook computers), and other kinds of devices (such as PalmPilot®-type devices, pagers, telephones, personal digital assistants, and so on). Derived database products may also be used on networked computing platforms and environments, including the Internet. The derived database products may be in a different format than the format in which the master copy of the database is maintained. The derived database products may be in a format that facilitates the uses of the derived products in the platforms in which they are installed. The derived database products may also be stored in a compressed format on the media on which they are located.

In an alternative embodiment, the data collection unit 54 of FIG. 4 may perform some of the steps of the data collection facility 74. In this embodiment, rather than sending the engine load, position and speed data to the data collection facility 74, the data collection unit 54 performs the analysis on the data to obtain the road grade information. The data collection unit 54 then stores the road grade data in a storage medium.

III. Alternatives

A. Data Collection System with Road Grade Sensor(s)

Figure 7:
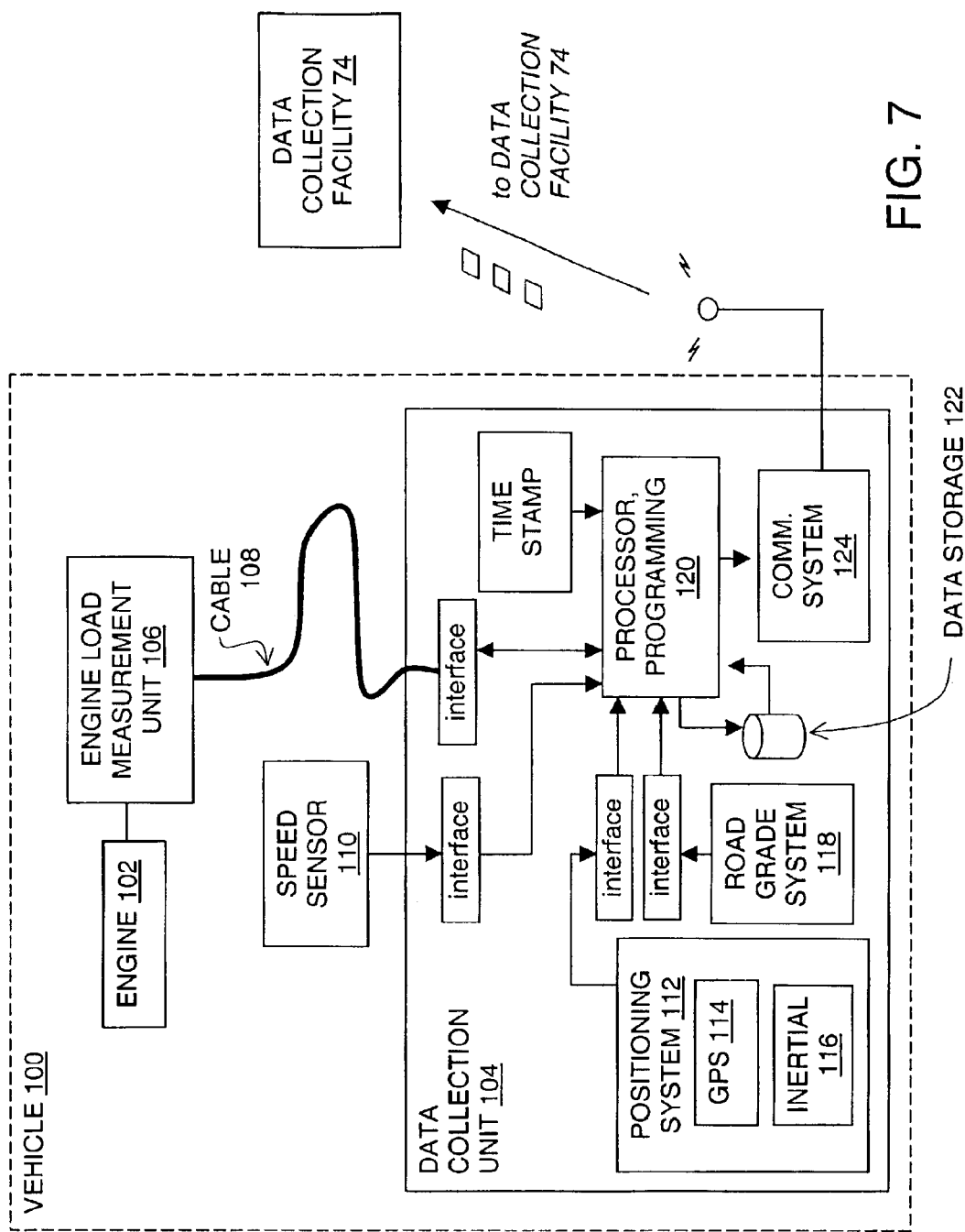
FIG. 7 is a block diagram illustrating another embodiment in which a vehicle is equipped for data collection.

FIG. 7 shows a vehicle 100 equipped with an engine 102 and a data collection unit 104. The vehicle 100 is similar to vehicle 50 described above in conjunction with FIG. 4; however, the vehicle 100 includes a road grade system 118 that directly collects road grade data. The vehicle 100 also includes an engine load measurement unit 106 that provides a measurement of engine load. The data collection unit 104 is connected to the engine load measurement unit 106 via a cable 108 or other suitable means. (Although not shown in FIG. 7, the data collection unit 104 may include other connections to the vehicle. For example, the data collection unit 104 may receive power from the vehicle battery via a power cable.) The data collection unit 104 is also connected to a speed sensor 110. The speed sensor 110 provides speed data that indicate the current speed of the vehicle 200.

The data collection unit 104 is a combination of hardware and software components. The data collection unit 104 includes a positioning system 112. The positioning system 112 includes a GPS 114. The positioning system 112 may also include inertial sensors 116. The positioning system 112 enables the position (e.g., latitude, longitude, and optionally altitude) of the data collection unit 104 (and thus the vehicle 100 in which it is located) to be determined.

The data collection unit 104 includes the road grade system 118 that measures the road grade. In one embodiment, the road grade system 118 includes a road grade sensor, such as a mechanical road grade sensor. Briefly, the mechanical road grade sensor has a weighted mechanical arm that gravity positions perpendicular to the horizontal plane of a vehicle when the vehicle is travel on a flat road segment. When the vehicle travels on an inclined or declined road segment, gravity will position the mechanical arm at an angle to the horizontal plane of the vehicle. The angle of the mechanical arm corresponds with the road grade value. In another embodiment, the road grade system 118 includes an altimeter, aneroid barometer or similar devices. The aneroid barometer is calibrated to show changes in atmospheric pressure in terms of linear elevation. As the vehicle travels up an incline, the aneroid barometer records the elevation at various points. The road grade may readily be determined based on the elevation between the points. Furthermore, the road grade system 118 may include any other devices for measuring the road grade.

The data collection unit 104 also includes the necessary hardware and software (processor and programming 120) to receive data from the positioning system 112, the speed sensor 110, the engine load measurement unit 106, and the road grade system 118. The data collection unit 104 includes the appropriate interfaces to allow the processor and programming 120 to receive data from the positioning system 112, the speed sensor 110, the engine load measurement unit 106 and the road grade system 118. The processor and programming 120 in the data collection unit 104 are suitable for selecting the engine load value from the engine load measurement unit 106 and the road grade value from the road grade system 118 at appropriate time periods, such as every second. Additionally, the processor and programming 120 selects the data from the positioning system 112 and the speed sensor 110 at corresponding times. The processor and programming 120 relate the data received from the positioning system 112, the speed sensor 110, the engine load measurement unit 106, and road grade system 118 to each other. Furthermore, the processor and programming 120 may associate the data received from the positioning system 112, the speed sensor 110, the engine load measurement unit 106, and road grade system 118 with a time stamp or any other information.

The data collection unit 104 includes a data storage device 122. The processor and programming 120 in the data collection unit 104 provide for storing some or all the data from the positioning system 112, the speed sensor 110, the engine load measurement unit 106, and the road grade system 118 on the data storage device 122. The data storage device 122 is a non-volatile data storage unit, such as a hard drive or a memory card.

The data collection unit 104 includes a communications system 124. The communications system 124 provides for sending some or all the data from the positioning system 112, the speed sensor 110, the engine load measurement unit 106, and the road grade system 118 to the remotely located data collection facility 74. In the embodiment of FIG. 7, the communications system 124 provides for wireless transmission of the data from the data collection unit 104 to the remotely located data collection facility 74. In the embodiment of FIG. 7, the data sent from the data collection unit 104 are stored temporarily on the data storage device 122 before being transmitted to the data collection facility 74. Various processes may be performed on the data before they are sent to the remotely located data collection facility 74. For example, the data may be compressed, filtered, normalized, etc. These processes may be performed to reduce the amount of data that need to be sent from the data collection unit 104 to the data collection facility 74. In one embodiment, the data collection unit 104 may filter the data according to filtering criteria, such as the criteria described above in conjunction with FIG. 5.

In one alternative, the data collected by the data collection unit 104 are sent every several seconds or minutes to the data collection facility 74 after being temporarily stored on the data storage device 122 in the data collection unit 104.

In another alternative embodiment, the data collected by the data collection unit 104 are sent directly to the data collection facility 74 without being temporarily stored on a data storage device in the data collection unit 104.

In another alternative embodiment, the data collected by the data collection unit 104 are stored in the vehicle for a relatively long period of time, e.g., several days or weeks. The data are then sent to the data collection facility 74. The data may be sent wirelessly via a communications system or alternatively, the data may be sent by other means. For example, the data may be transmitted over land-based telephone lines or the Internet. In another embodiment, the data storage medium upon which the data are stored is physically sent to the data collection facility 74 (e.g., by mail). At the data collection facility 74, further processing of the data takes place.

According to one embodiment, the data collection facility 74 obtains road grade information and updates the geographic database following the steps described above in conjunction with FIG. 5. In addition to the analysis described above to determine road grade data, the data collection facility 74 may process the data provided by the road grade system 118 with the engine load data. The data from the road grade system 118 may often include noise that leads to inaccurate road grade values. For example, the mechanical road grade sensor is very susceptible to bumps or rough roads. Additionally, the aneroid barometer may provide inaccurate readings due to weather, wind and speed of the vehicle. To identify and remove the inaccurate road grade measurements provided by the road grade system 118, the data collection facility 74 processes the data from the road grade system 118 in conjunction with corresponding engine load data. In one embodiment, the engine load data is processed as described above to obtain the locations of road grade change points. The locations of road grade change points are used to verify the accuracy of the data from the road grade system 118 and remove inaccurate road grade measurements. For example, if the data from the road grade system 118 indicates a change in road grade that does not correspond with the location of the road grade change points identified with the engine load data, the data collection facility 74 identifies data from the road grade system 118 as being inaccurate.

In another embodiment, the data collection facility 74 processes the data provided by the road grade system 118 with the engine load data. The engine load data is processed as described above to obtain the direction of road slope, such as incline decline and level. The directions of road slope are used to verify the accuracy of the data from the road grade system 118 and to remove inaccurate sensor readings. For example, if the data from the road grade system 118 indicates a road grade that does not correspond with the direction of road slope identified with the engine load data, the data collection facility 74 identifies data of the road grade system 118 as being inaccurate. In yet another embodiment, the data collection facility 74 processes the data provided by the road grade system 118 with the engine load data. The engine load data is processed as described above to obtain the actual road grade values. The actual road grade values determined with the engine load data are compared to the road grade values provided with the road grade system 118. If the data from the road grade system 118 deviates from the engine load road grade values for a corresponding location by an amount greater than a predetermined amount, the data from road grade system 118 is identified as an inaccurate measurement.

B. Applications for the Road Grade Data

The road grade data within the geographic database have several applications. First, various driver assistance systems for vehicles that help make travel more efficient and convenient may use the road grade data. For example, one driver assistance system that may use the road grade data is an automatic transmission control system. The automatic transmission control system adjusts the operation of the vehicle transmission to match the grade of the upcoming road. Another driver assistance system that may use the road grade data is an adaptive cruise control system.

In another embodiment, the geographic database may include engine load data as an attribute of the road grade data for use by the driver assistance systems. According to this embodiment, the data collection facility 74 performs statistical analysis on the engine load data and other data from numerous vehicles. The analysis provides a statistical distribution of the appropriate engine load at positions along the road. In another embodiment, the analysis provides an appropriate change in engine load corresponding to the locations of road grade change points. The geographic database includes the engine load data, and the driver assistance systems use the engine load data to automatically control the vehicle transmission. For example, the geographic database may identify a road grade change point and appropriate engine load. The driver assistance system using the geographic database adjusts operation of the vehicle transmission to match the grade of the upcoming road.

It is intended that the foregoing detailed description be regarded as illustrative rather than limiting and that it is understood that the following claims including all equivalents are intended to define the scope of the invention.

I claim:

1. A method of obtaining data for a geographic database using a vehicle moving on roads in a geographic region comprising the steps of:

collecting data indicating engine load value and position of the vehicle as the vehicle travels in the geographic region;

identifying a location of a road grade change point corresponding to a change in the engine load value data; and updating the geographic database to indicate the road grade change point.

2. The method of claim 1 further comprising identifying a direction of the road grade after said road grade change point.

3. The method of claim 1 further comprising identifying a percentage of road grade change of the road after said road grade change point.

4. The method of claim 1 further comprising identifying a road grade value for the road after the road grade change point.

5. The method of claim 1 further comprising collecting data indicating a speed of the vehicle.

6. The method of claim 5 further comprising:

identifying data indicating engine load value corresponding with a change in the speed data; and filtering data indicating engine load value corresponding with said identified change in the speed data.

7. The method of claim 1 further comprising collecting data with a road grade sensor.

8. The method of claim 1 wherein the vehicle is a probe data collection vehicle that collects data while traveling in the geographic region for purposes other than data collection.

9. A method of obtaining data for a geographic database using a vehicle moving on roads in a geographic region comprising the steps of:

collecting data indicating engine load value and position of the vehicle as the vehicle travels in the geographic region;

collecting with a road grade sensor;

identifying a location of a road grade change point corresponding to a change in the engine load value data;

identifying inaccurate data from the road grade sensor when the data from the road grade sensor indicates a change in road grade that does not correspond to the location of the road grade change point; and updating the geographic database to indicate the road grade change point.

10. A method of collecting data for a geographic database that represents roads in a geographic region, the method comprising:

with a vehicle that travels along the roads, receiving engine load data in a data collection system unit located in the vehicle, wherein the engine load data is obtained from an engine load measurement unit associated with an engine located in the vehicle;

analyzing said engine load data;

based on said analyzing, inferring road grade data along said roads; and storing said road grade data in said geographic database.

11. The method of claim 10 wherein said road grade data indicates a location of a road grade change point corresponding to a change in the engine load data.

12. The method of claim 10 wherein said road grade data indicates a direction of the road grade.

13. The method of claim 10 wherein said road grade data indicates a road grade value for the road.

14. The method of claim 10 further comprising:

collecting data indicating a speed of the vehicle;

identifying data indicating engine load corresponding with a change in the speed data; and filtering data indicating engine load corresponding with said identified change in the speed data.

15. The method of claim 10 further comprising collecting data with a road grade sensor.

16. The method of claim 10 wherein the engine load measurement unit receives engine load data from an electronic control unit associated with the engine.

17. The method of claim 10 wherein the engine load measurement unit receives engine load data from an OBDII port associated with the engine.

18. A method of collecting data for a geographic database that represents roads in a geographic region, the method comprising:

with a vehicle that travels along the roads, receiving engine load data in a data collection system unit located in the vehicle, wherein the engine load data is obtained from an engine load measurement unit associated with an engine located in the vehicle;

analyzing said engine load data;

based on said analyzing, inferring road grade data along said roads; and storing data in said geographic database that represent road grade, wherein said road grade data indicates an engine load value associated with positions along the road.

19. A system for collecting data for a geographic database that represents roads in a geographic region comprising:

a data collection unit located in a vehicle that travel along the roads in the geographic region;

an engine load measurement unit associated with an engine of the vehicle, said engine load measurement unit providing engine load data to said data collection unit;

a data processing unit analyzing said engine load data based on said analyzing, inferring road grade data along said roads and storing said road grade data in the geographic database.

20. The system of claim 19 wherein said data processing unit is located in a data collection facility.

* * * * *